United States Patent
Tuli

(10) Patent No.: US 9,883,007 B2
(45) Date of Patent: Jan. 30, 2018

(54) DOWNLOADING AN APPLICATION TO AN APPARATUS

(71) Applicant: Microsoft Technology Licensing, LLC, Redmond, WA (US)

(72) Inventor: Apaar Tuli, Helsinki (FI)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/600,207

(22) Filed: Jan. 20, 2015

(65) Prior Publication Data

US 2016/0212240 A1    Jul. 21, 2016

(51) Int. Cl.

| | |
|---|---|
| G06F 9/445 | (2006.01) |
| H04L 29/08 | (2006.01) |
| G06F 3/0488 | (2013.01) |
| G06F 3/0481 | (2013.01) |
| G06F 3/16 | (2006.01) |
| G06F 9/44 | (2006.01) |
| H04M 1/725 | (2006.01) |

(52) U.S. Cl.
CPC ............ *H04L 67/34* (2013.01); *G06F 3/0488* (2013.01); *G06F 3/04817* (2013.01); *G06F 3/167* (2013.01); *G06F 8/34* (2013.01); *G06F 8/61* (2013.01); *G06F 9/4443* (2013.01); *H04M 1/72525* (2013.01)

(58) Field of Classification Search
CPC ........ G06F 8/60–8/61; G06F 3/0481–3/04897
USPC .................. 717/168–178; 715/210, 700–978
See application file for complete search history.

(56) References Cited

U.S. PATENT DOCUMENTS

| | | | |
|---|---|---|---|
| 6,724,403 B1 * | 4/2004 | Santoro | G09G 5/14 715/765 |
| 7,661,068 B2 | 2/2010 | Lund | |
| 7,987,431 B2 * | 7/2011 | Santoro | G06F 3/0481 715/729 |
| 8,010,900 B2 * | 8/2011 | Hart | G06F 11/1448 715/747 |
| 8,099,332 B2 * | 1/2012 | Lemay | G06F 8/61 705/26.1 |
| 8,239,206 B1 | 8/2012 | LeBeau et al. | |
| 8,687,023 B2 * | 4/2014 | Markiewicz | G06F 3/0485 345/173 |
| 8,707,217 B2 | 4/2014 | Nguyen | |

(Continued)

OTHER PUBLICATIONS

Graziano, Dan, "Make sure you're using the S Pen correctly", Published on: Oct. 3, 2013, Available at: http://www.cnet.com/how-to/make-sure-youre-using-the-s-pen-correctly/.

(Continued)

*Primary Examiner* — Francisco Aponte

(57) ABSTRACT

An apparatus for downloading an application from an application store comprises at least one processor and at least one memory storing program instructions that, when executed by the at least one processor, cause the apparatus to receive user input on a touch sensitive graphical user interface providing a view of applications stored on an apparatus, the user input initiating downloading of an application to the apparatus, recognize at least one application in an application store corresponding to the received user input, and download an application of the at least one application from the application store to a memory of the apparatus.

20 Claims, 5 Drawing Sheets

(56) References Cited

U.S. PATENT DOCUMENTS

| | | | | |
|---|---|---|---|---|
| 8,751,321 B2* | 6/2014 | Lemay | G06F 8/61 | |
| | | | 705/26.1 | |
| 8,762,985 B2* | 6/2014 | Cho | G06F 8/61 | |
| | | | 709/203 | |
| 8,769,443 B2* | 7/2014 | King | G06F 3/04883 | |
| | | | 715/863 | |
| 8,839,235 B2* | 9/2014 | Lee | G06F 8/61 | |
| | | | 717/152 | |
| 8,892,679 B1* | 11/2014 | Destagnol | G06Q 10/10 | |
| | | | 709/203 | |
| 8,984,388 B2* | 3/2015 | Seo | H04N 5/445 | |
| | | | 715/204 | |
| 9,009,630 B2* | 4/2015 | Kruzeniski | G06F 21/6209 | |
| | | | 715/817 | |
| 9,032,317 B2* | 5/2015 | Santoro | G06F 3/0481 | |
| | | | 715/729 | |
| 9,052,925 B2* | 6/2015 | Chaudhri | G06F 3/04883 | |
| 9,122,307 B2* | 9/2015 | Jacobsen | G06F 3/011 | |
| 9,207,838 B2* | 12/2015 | Khoe | G06F 3/0481 | |
| 9,244,606 B2* | 1/2016 | Kocienda | G06F 3/04883 | |
| 9,465,633 B2* | 10/2016 | Newell | G06F 9/45545 | |
| 9,507,781 B2* | 11/2016 | Potts | G06F 17/30058 | |
| 2007/0198950 A1* | 8/2007 | Dodge | G06F 3/0481 | |
| | | | 715/815 | |
| 2008/0222545 A1* | 9/2008 | Lemay | G06F 3/04883 | |
| | | | 715/765 | |
| 2010/0042692 A1* | 2/2010 | Irwin | G06F 8/60 | |
| | | | 709/206 | |
| 2011/0252357 A1* | 10/2011 | Chaudhri | G06F 3/04883 | |
| | | | 715/780 | |
| 2011/0258582 A1* | 10/2011 | Bang | G06F 3/04817 | |
| | | | 715/811 | |
| 2011/0307778 A1* | 12/2011 | Tsai | G06F 9/4443 | |
| | | | 715/702 | |
| 2012/0216143 A1* | 8/2012 | Shiplacoff | G06F 3/0416 | |
| | | | 715/784 | |
| 2012/0218304 A1* | 8/2012 | Anzures | G06F 1/1626 | |
| | | | 345/649 | |
| 2013/0080923 A1* | 3/2013 | Anzures | G06F 1/1626 | |
| | | | 715/753 | |
| 2014/0090077 A1 | 3/2014 | Jeong et al. | | |
| 2014/0164963 A1* | 6/2014 | Klemenz | G06F 3/04886 | |
| | | | 715/765 | |
| 2014/0201655 A1 | 7/2014 | Mahaffey et al. | | |
| 2014/0214898 A1 | 7/2014 | Shapira et al. | | |
| 2014/0229839 A1* | 8/2014 | Lynch | G06F 9/44505 | |
| | | | 715/736 | |
| 2014/0237402 A1 | 8/2014 | Pang et al. | | |
| 2014/0253520 A1 | 9/2014 | Cueto et al. | | |
| 2014/0298244 A1 | 10/2014 | Kim | | |
| 2014/0358970 A1* | 12/2014 | Morris | G06F 17/30392 | |
| | | | 707/772 | |
| 2014/0359408 A1* | 12/2014 | Rosenberg | G06F 17/2235 | |
| | | | 715/205 | |
| 2014/0359598 A1* | 12/2014 | Oliver | G06F 8/61 | |
| | | | 717/174 | |
| 2015/0006182 A1 | 1/2015 | Schmidt | | |

OTHER PUBLICATIONS

Sabri, Sam, "New app Tile Editor 8.1 launches for Windows Phone, win a Lumia 730 for trying it out", Published on: Sep. 25, 2014, Available at: http://www.windowscentral.com/new-app-tile-editor-launches-windows-phone-devs-giving-away-lumia-730-best-tile-created.

"International Search Report and Written Opinion Issued in PCT Application No. PCT/US2016/013768", dated May 11, 2016, 10 pages.

"Second Written Opinion Issued in PCT Application No. PCT/US2016/013768", dated Dec. 13, 2016, 5 pages.

"International Preliminary Report on Patentability Issued in PCT Application No. PCT/US2016/013768", dated Apr. 11, 2017, 5 Pages.

* cited by examiner

DOWNLOADING AN APPLICATION TO AN APPARATUS

BACKGROUND

Graphical user interfaces are used in various devices, for example, in computers, tablet computer, mobile devices and smart phones, to enable interaction with a user. For example, an operating system of a device may provide a graphical user interface via which a user is able use the device. Often the user is also able to use various applications in the device and also install new applications. A new application may be installed using an application store, which may be linked to the operating system, or from a web page via the Internet.

When the user wishes to install a new application, for example, from the application store, the user enters the application store and selects or searches the desired application, and the application will be installed to the device.

SUMMARY

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

A method comprising receiving user input on a touch sensitive graphical user interface providing a view of applications stored on an apparatus, the user input initiating downloading of an application to the apparatus; recognizing at least one application in an application store corresponding to the received user input; and downloading an application of the at least one application from the application store to a memory of the apparatus.

An apparatus comprises at least one processor, and at least one memory storing program instructions that, when executed by the at least one processor, cause the apparatus to: receive user input on a touch sensitive graphical user interface providing a view of applications stored on an apparatus, the user input initiating downloading of an application to the apparatus; recognize at least one application in an application store corresponding to the received user input; and download an application of the at least one application from the application store to a memory of the apparatus.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
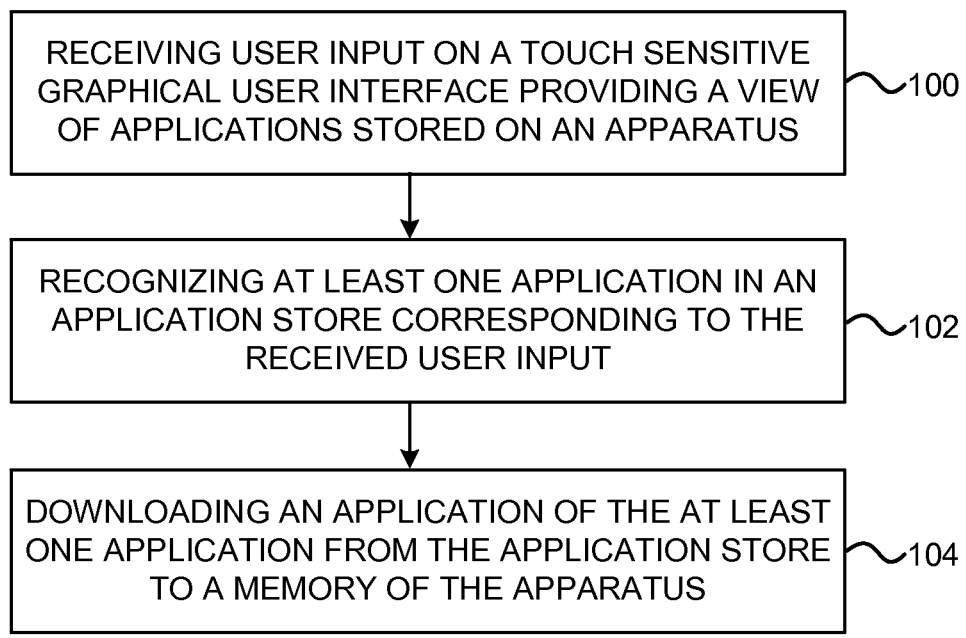
FIG. 1 is a block diagram of an example method for downloading an application to an apparatus.

FIG. 1 is a block diagram of example method for downloading an application to an apparatus. At 100 user input is received on a touch sensitive graphical user interface providing a view of applications stored on an apparatus. The user input initiates downloading of an application to the apparatus. The user input may also include voice input. At 102, at least one application in an application store corresponding to the received user input is recognized. If there is a single match, the application may be automatically downloaded and installed to the apparatus. In one example, if there is a single application matching the user input, the match may still be presented to the user on the graphical interface since it may be possible that the application is not the one the user intended to download. Further, the user may be provided a selection possibility, for example, in a popup window, to seek confirmation or rejection from the user for the application downloading.

If there are multiple matches, a list of alternatives may be provided to the user on the graphical user interface or via voice output. At 104 an application of the at least one application (i.e. the application being the exact match or the application selected by the user from multiple alternatives) is downloaded from the application store to a memory of the apparatus.

Figure 2A:
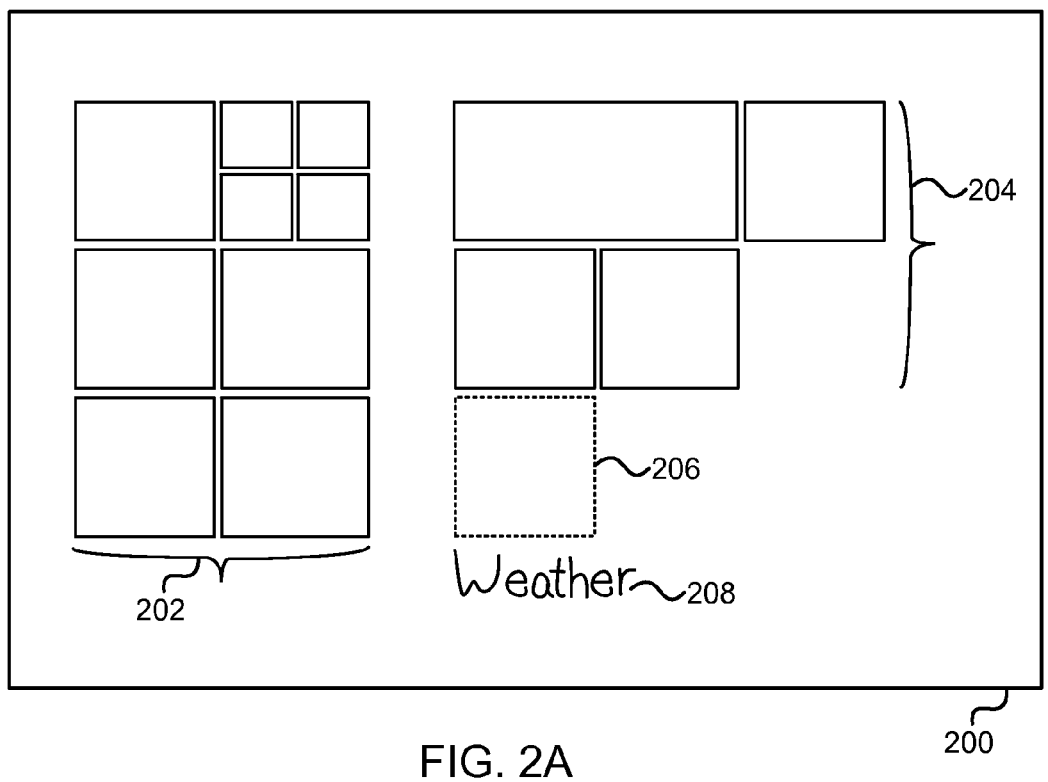
FIG. 2A is an example of a simplified graphical user interface view provided by an apparatus.

FIG. 2A is an example of a simplified graphical user interface view 200 provided by an apparatus. The apparatus is, for example, a computer, a laptop computer, a tablet computer, a mobile device, a smart phone or any other device providing a graphical user interface. The view 200 includes a plurality of application icons which are indicated by reference numbers 202, 204. The application icons in this example are tiles of different sizes, where each tile is linked to an application. A tile may present information to a user relating to the application. For example, if the tile relates to an email application, the tile itself may indicate information relating to emails for example, the number of new emails, titles of new emails etc. A tile may also be static. In other words, it may only act as a link. When the user selects the tile, the application relating to the tile is launched.

An application store may be an integral feature of the operating system of the device. From the application store, the user is able to install new applications. In this example, the dashed line of a tile 206 means that the user has drawn a rectangle on the graphical user interface. If the graphical user interface is touch-sensitive user interface, the user may use his finger, stylus or a special pen to draw the rectangle. The rectangle provides a location and size indication for a new application tile.

The user writes a name of the application he wants to install or part of the name. In this example, the user writes "Weather" 208 in the vicinity of the rectangle. The operating system automatically searches applications that match with "Weather" from the application store. The present example assumes that there is a single application in the application store that matches to "Weather" 208. The rectangle 206 and the text "Weather" 208 together act as an input that initiates downloading of an application to the device from the application store. After this input, the application is automatically downloaded to the device and the rectangle 208 will be replaced with an actual application icon relating to the installed application and the text "Weather" 208 input by the user will be removed from the graphical user interface view 200.

Figure 2B:
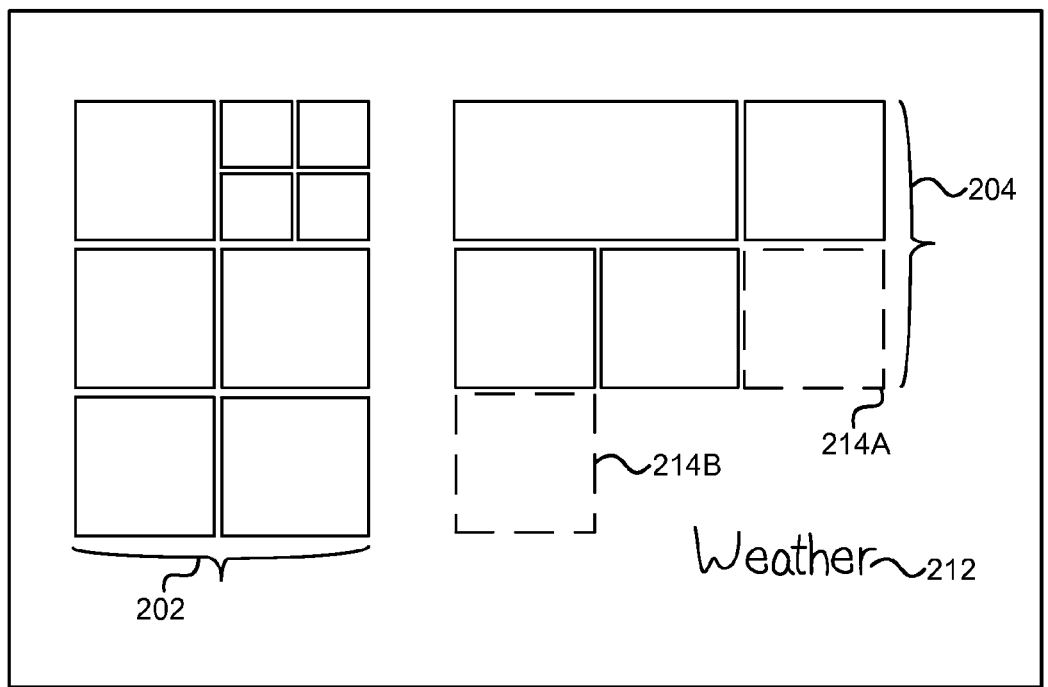
FIG. 2B is an example of a simplified graphical user interface view provided by an apparatus.

FIG. 2B is another example of a simplified graphical user interface view 210 provided by an apparatus. The example disclosed in FIG. 2B is similar to the example disclosed in FIG. 2A with the exception that in the example of FIG. 2B the user only writes "Weather" 212 somewhere on the graphical user interface and makes no indication of a place for the tile or icon relating to the application to be downloaded. Rectangles 214A, 214B indicate two possible places where the tile relating to the application could positioned on the graphical user interface view 210.

As in the example of FIG. 2A, there is a single application in the application store that matches to "Weather" 212. Again, the application is automatically downloaded to the device and the icon relating to the downloaded application is placed in place of the rectangle 214A or 214B and the text "Weather" 212 input by the user will be removed from the graphical user interface view 210.

Figure 2C:
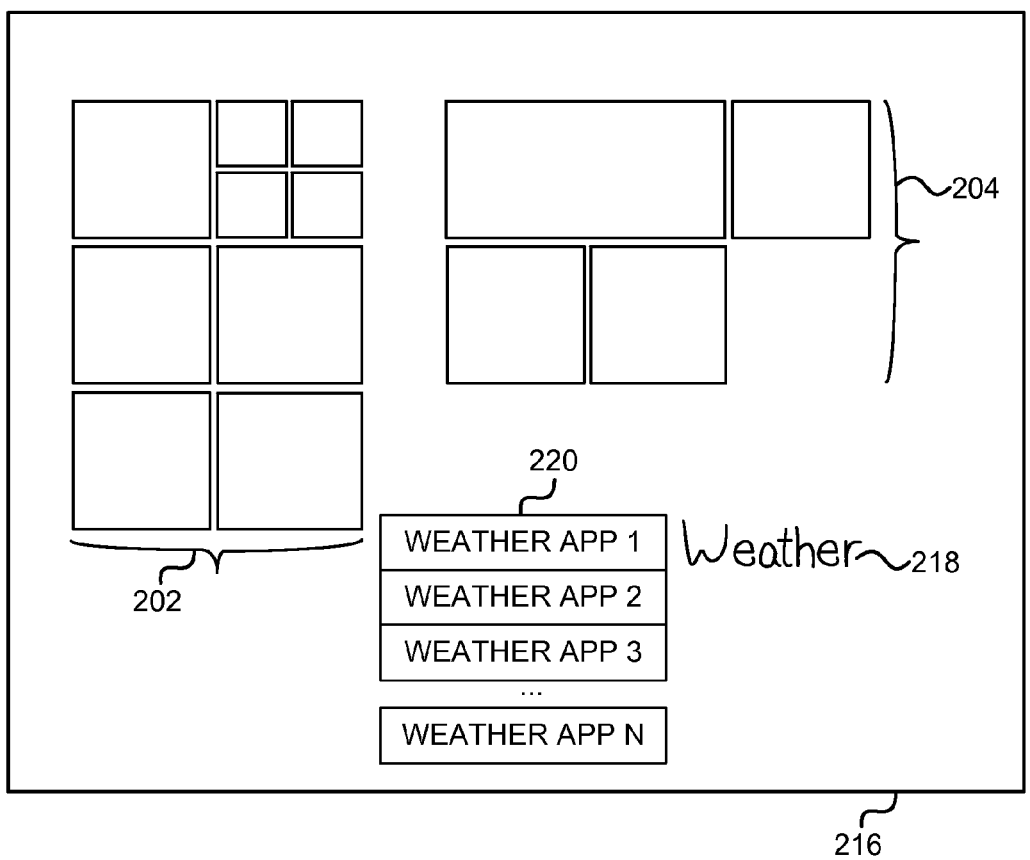
FIG. 2C is an example of a simplified graphical user interface view provided by an apparatus.

FIG. 2C is another example of a simplified graphical user interface view 216 provided by an apparatus. The example disclosed in FIG. 2C is similar to the example disclosed in FIG. 2B with the exception that in the example of FIG. 2C there is no single application matching to "Weather" 218 in the application store but multiple possible matches. In response to multiple matches, the user is provided a list of applications 220 matching to the term "Weather" 218. The user selects one of the given alternatives, and the selected application is downloaded to the device.

As disclosed in FIG. 2C the user may not have indicated any location for the tile relating to the application to be downloaded. Thus, the application icon can be placed to any appropriate place on the graphical user interface view 216. In another example, as illustrated in the example of FIG. 2A, the user may have provided an indication of the location of the tile on the graphical user interface view relating to the application to be downloaded.

Figure 2D:
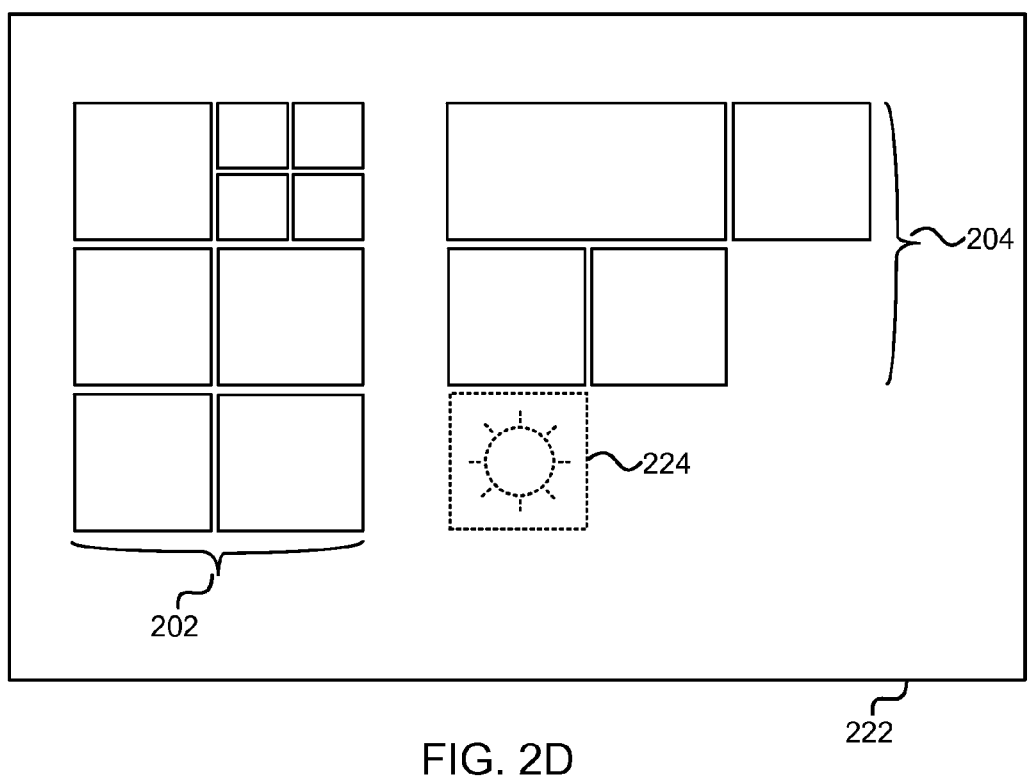
FIG. 2D is an example of a simplified graphical user interface view provided by an apparatus.

FIG. 2D is another example of a simplified graphical user interface view 222 provided an apparatus. The example disclosed in FIG. 2D is similar to the example disclosed in FIG. 2A with the exception that in the example of FIG. 2D the user draws an application icon 224 or part of the application icon somewhere on the graphical user interface view 222. The operating system of the apparatus or the application store is configured to determine whether the drawn application icon 224 matches to an actual application icon of one or more applications in the application store. The example of FIG. 2D illustrates a situation where there is a single match, and the application is automatically downloaded and installed to the device. After the installation, the application icon 224 drawn by the user is replaced with the actual icon relating to the installed application. Drawing an icon for an application provides a new and intuitive way to search for an application and to install it.

Figure 2E:
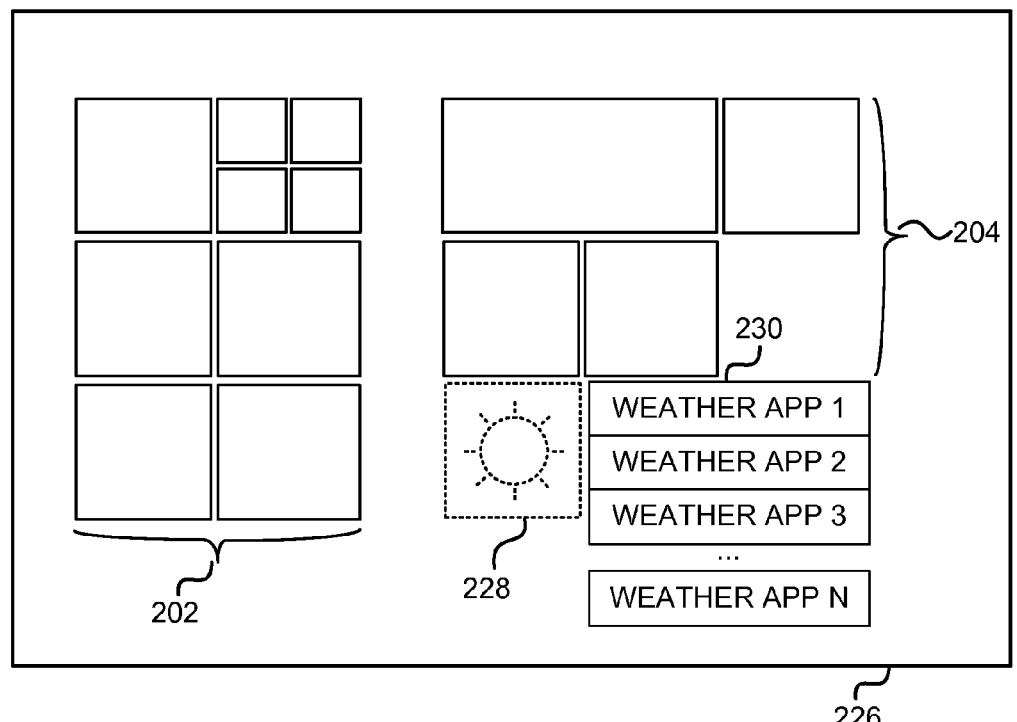
FIG. 2E is an example of a simplified graphical user interface view provided by an apparatus.

FIG. 2E is another example of a simplified graphical user interface view 222 provided by an apparatus. The example disclosed in FIG. 2E is similar to the example disclosed in FIG. 2D with the exception that in the example of FIG. 2E there are multiple applications matching the application icon 228 drawn by the user. In response to multiple matches, the user is provided a list of applications 230 matching to the term "Weather". The user selects one of the given alternatives, and the selected application is downloaded to the device. After the installation, the application icon 228 drawn by the user is replaced with the actual icon relating to the installed application.

Figure 2F:
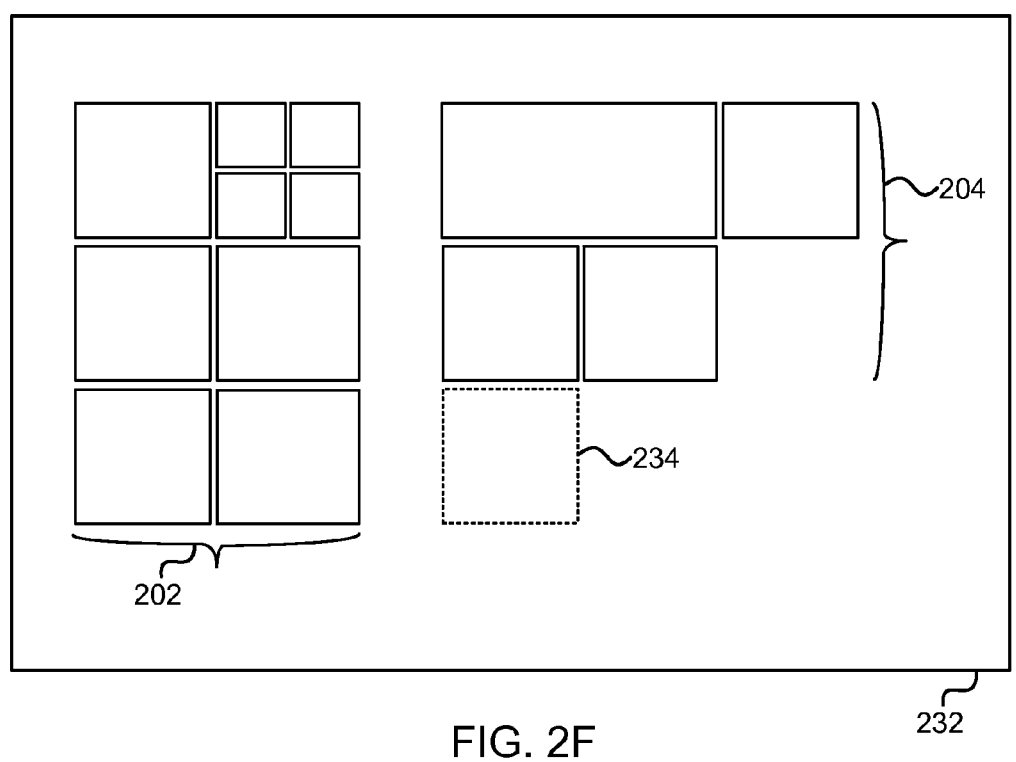
FIG. 2F is an example of a simplified graphical user interface view provided by an apparatus.

FIG. 2F is another example of a simplified graphical user interface view 232 provided by an apparatus. The example disclosed in FIG. 2F is similar to the example disclosed in FIG. 2A with the exception that in the example of FIG. 2A the user makes on the graphical user interface some indication that can be interpreted as a desire to download a new application. In the example of FIG. 2F the indication is that the user draws a rectangle 134. The rectangle is an indication to the operating system of the device that the user wishes to download some application. In other examples, the indication may be any other indication on the graphical user interface, for example, a predefined pattern. In response to the indication, a microphone of the device is activated and the device starts listening voice input from the user. After making the indication on the graphical user interface, the user says, for example, the word "weather". The device searches applications in the application store to find a match to "weather". If only a single match is found, the downloading of the application is initiated automatically. An application icon relating to the application may be provided on the graphical user interface, for example, on the location on the graphical user interface where the user originally input the indication.

If there are multiple matches, the device may give the user a list on alternatives matching "weather". The list may be provided on the graphical user interface (as disclosed, for example, in FIG. 2C and FIG. 2E). After the user selects one of the alternatives on the list, the selected application is downloaded to the device from the application store. Alternatively, the list may be provided via an audio interface, for example, using a speaker of the device. In response to the list provided via the audio interface, the user selects one of the applications on the list, for example, by saying "weather in Finland". The device receives the new voice input from the user and after applying the voice recognition algorithm to the voice input it recognizes that the user selected "weather in Finland" application. The application is then downloaded to the device from the application store. An application icon relating to the application may be provided on the graphical user interface, for example, on the location on the graphical user interface where the user originally input the indication.

In one example of any of the examples illustrated in FIGS. 2A-2F, although there might be a single match to the user input (for example, "Weather", graphical icon drawn by the user etc.) the match may still be presented to the user on the graphical interface before starting the application downloading since it may be possible that the application is not the one the user intended to download. Further, the user may be provided a selection possibility, for example, in a popup window, to seek confirmation or rejection from the user for the application downloading In any of the examples illustrated in FIGS. 2A-2F, the apparatus may be arranged to operate in a writing mode or an application management mode in which the user is able to provide input via the graphical user interface while providing the plurality of application icons are indicated by reference numbers 202, 204. The graphical user interface may provide means for enabling the user to enter the writing mode or application management mode, for example, a button on the graphical user interface.

In any of the examples illustrated in FIGS. 2A-2F, if there is a payment relating to an application in the list, the cost of the application may be indicated in connection with the name of the application. Further, the user might have to approve a payment of the selected application before the downloading of the application can begin. In one example, the user may be prompted to press a confirm or buy button to continue with the purchase and downloading of the application. In one further example, the user may be asked to confirm the payment with his handwritten signature on the graphical user interface. The handwritten signature may replace the need for entering an application store password, or pressing a confirm or buy button. In this case, the user simply signs his name when prompted, and the application download begins once the user's credit card has been charged.

If there are any other actions that must be performed before the downloading of the application can begin (for example, accepting terms and conditions of the application store etc.), the user may be prompted to indicate approval, for example, using a popup window Although the examples in FIGS. 2A-2F illustrate a tile type graphical user interface, the applications or icons relating to the applications on the graphical user interface may be arranged using any other solution.

The example disclosed in any of FIGS. 2A-2F discloses an easy and intuitive way to initiate installation of a new application. The user need not enter the application store in order to be able to download an application. Instead, the user is able to initiate the application download from a normal operating system application view illustrating applications stored in the apparatus. Thus, the disclosed solution simplifies and speeds up the process of installing a new application. Further, the user may also determine a correct place for an application icon relating to the application to be downloaded on the graphical user interface.

Figure 3A:
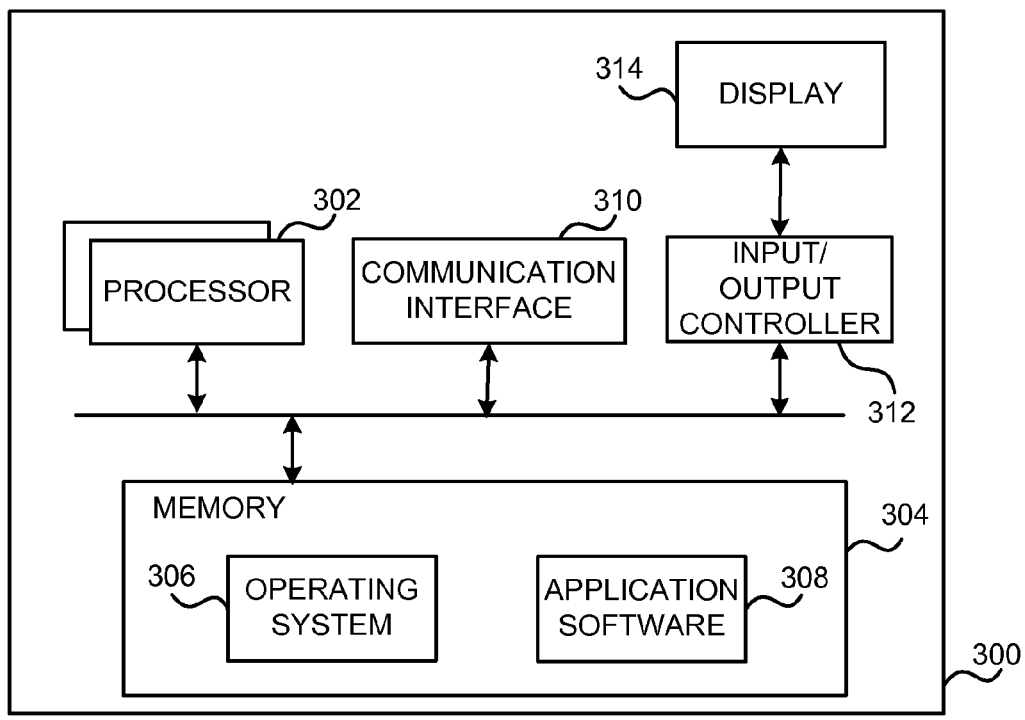
FIG. 3A is an example of an apparatus providing a graphical user interface and enabling downloading of an application.

FIG. 3A illustrates various components of an example apparatus 300 which may be implemented as any form of a computing and/or electronic device. The apparatus 300 may be used to implement the views disclosed in any of FIGS. 2A-2F. The apparatus 300 is, for example, a computer, a laptop computer, a tablet computer, a mobile device, a smart phone or any other device providing a graphical user interface.

Further, the examples disclosed in FIGS. 2A, 2D, 2E and 2F provide a solution where the user first chooses the spatial location on the graphical user interface for the icon of an application before downloading the application. This is different from current implementations. When an application is downloaded from an application store using a normal procedure, the icon relating to the downloaded application is placed "somewhere" on the graphical user interface, normally at the end of the already existing application icons or alphabetically. If the user wants the icon appear somewhere else, it needs to be manually moved to a desired location. The disclosed solution enables the user to place the icon of the application directly to the right location, The example disclosed in any of FIGS. 2A-2F provides a solution where an application store becomes a background service, and users can fetch the content from the application store without having to actually enter the application store.

In any of the examples illustrated in FIGS. 2A-2F, pen interaction with the apparatus can be separated from finger touch interaction. This can be used to provide additional functionalities on the graphical user interface. For example, the user can use his fingers to navigate in the view or application list view on the graphical user interface, whereas the pen is used to install an application in the same view as disclosed by the examples.

The apparatus 300 comprises one or more processors 302 which may be microprocessors, controllers or any other suitable type of processors for processing computer executable instructions to control the operation of the apparatus 300. Platform software comprising an operating system 306 or any other suitable platform software may be provided at the mobile apparatus to enable application software 308 to be executed on the device.

Computer executable instructions may be provided using any computer-readable media that is accessible by the apparatus 300. Computer-readable media may include, for example, computer storage media such as memory 304 and communications media. Computer storage media, such as memory 304, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 304) is shown within the apparatus 300 it will be appreciated that the storage may be distributed or located remotely and accessed via a network or other communication link (e.g. using communication interface 310).

The apparatus 300 may comprise an input/output controller 312 arranged, for example, to output display information to a display 314 which may be separate from or integral to the apparatus 300. The input/output controller 312 may also be arranged to receive and process input from one or more devices, such as a user input device (e.g. a keyboard, camera, microphone or other sensor). In one example, the display 314 may also act as a user input device if it is a touch sensitive display. The input/output controller 312 may also output data to devices other than the display device, e.g. a locally connected printing device.

The input/output controller 312, display 314 and optionally user input device may comprise natural user interaction (NUI) technology which enables a user to interact with the mobile apparatus in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence.

Figure 3B:
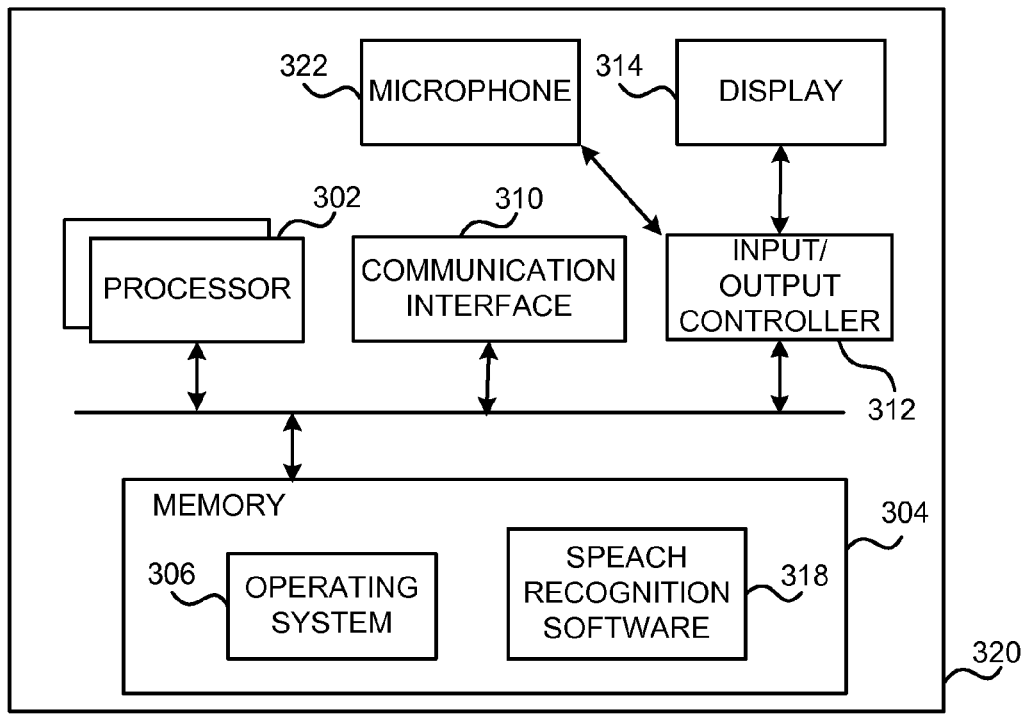
FIG. 3B is an example of an apparatus providing a graphical user interface and enabling downloading of an application.

FIG. 3B illustrates various components of another example apparatus 320 which may be implemented as any form of a computing and/or electronic device. The apparatus 320 may be used to implement the views disclosed in any of FIGS. 2A-2F. The apparatus 320 illustrated in FIG. 3B differs from the apparatus illustrated in FIG. 3A in that the apparatus 320 configured to process and analyze voice input from a user.

As illustrated in FIG. 2F and its description, the user performs on a graphical user interface of the apparatus 320 some indication that can be interpreted as a desire to download a new application. In response to the indication the processor 302 controls the apparatus 320 to activate a microphone 322. The microphone 322 receives voice input from the user, and the processor 302 controls the apparatus 320 to recognize the user input with speech recognition software 318. When the user input has been recognized with the speech recognition software 318, the processor 302 controls the apparatus 320 to search, via the communication interface 310, from an application store applications matching the recognized user input. If there is a single match, the processor 302 then controls the apparatus 320 to download the matching application to the memory 304. If are there multiple applications in the application store matching the recognized user input, the processor 302 controls the apparatus 320 to present the alternatives to the user on the display 314 or via audio output means, for example, a speaker as voice output. The user may then select an application from the alternatives via the graphical user interface on the display 314 or by providing a new voice input. After the voice recognition algorithm is applied to the voice input and the voice input is recognized or after the user selection via the graphical user interface is recognized, the processor 302 controls the apparatus 320 to download the application to the memory 304 from the application store via the communication interface 310. An application icon relating to the application may be provided on the graphical user interface.

An embodiment of a method comprises: receiving user input on a touch sensitive graphical user interface providing a view of applications stored on an apparatus, the user input initiating downloading of an application to the apparatus; recognizing at least one application in an application store corresponding to the received user input; and downloading an application of the at least one application from the application store to a memory of the apparatus.

In one example, the user input comprises a location indication for a shortcut icon on the graphical user interface, and the method comprises: receiving vocal information from the user; and recognizing at least one application corresponding to the received vocal information from the user.

In one example, alternatively or in addition, the method comprises: providing vocal information to the user about multiple applications after recognizing multiple applications corresponding to the received user input; receiving from the user vocal information selecting an application from the multiple applications; and wherein the downloading comprises downloading the selected application from the application store.

In one example, alternatively or in addition, the method comprises: providing an indication on the graphical user interface about multiple applications after recognizing multiple applications corresponding to the received user input; receiving a selection of an application from the multiple applications via the graphical user interface; and wherein the downloading comprises downloading the selected application from the application store.

In one example, alternatively or in addition, the method comprises: providing an indication on the graphical user interface about multiple applications after recognizing multiple applications corresponding to the received user input; receiving a selection of an application from the multiple applications via the graphical user interface; and wherein the downloading comprises downloading the selected application from the application store.

In one example, alternatively or in addition, the method comprises: recognizing a single application corresponding to the received user input; wherein the downloading comprises downloading the application from the application store without further user input.

In one example, the method comprises: requesting approval from the user before downloading the application; and downloading the application after receiving the approval from the user.

In one example, receiving user input on the graphical interface comprises receiving textual user input identifying the name of an application to be downloaded at least partially.

In one example, alternatively or in addition, the user input comprises a location indication for a shortcut icon on the graphical user interface.

In one example, alternatively or in addition, the user input comprises at least a partial graphical icon identifying an application to be downloaded.

In one example, alternatively or in addition, the method comprises: providing an application management mode selector on the graphical user interface; and entering the application management mode after receiving user selection of the application management mode selector.

An embodiment of an apparatus comprises at least one processor, and at least one memory storing program instructions that, when executed by the at least one processor, cause the apparatus to: receive user input on a touch sensitive graphical user interface providing a view of applications stored on an apparatus, the user input initiating downloading of an application to the apparatus; recognize at least one application in an application store corresponding to the received user input; and download an application of the at least one application from the application store to a memory of the apparatus.

In one example, the user input comprises a location indication for a shortcut icon on the graphical user interface, wherein the at least one memory storing program instructions that, when executed by the at least one processor, cause the apparatus to: receive vocal information from the user; and recognize at least one application corresponding to the received vocal information from the user.

In one example, alternatively or in addition, the at least one memory stores program instructions that, when executed by the at least one processor, cause the apparatus to: provide vocal information to the user about multiple applications after recognizing multiple applications corresponding to the received user input; receive from the user vocal information selecting an application from the multiple applications; and wherein the downloading comprises downloading the selected application from the application store.

In one example, alternatively or in addition, the at least one memory stores program instructions that, when executed by the at least one processor, cause the apparatus to: provide an indication on the graphical user interface about multiple applications after recognizing multiple applications corresponding to the received user input; receive a selection of an application from the multiple applications via the graphical user interface; and wherein the downloading comprises downloading the selected application from the application store.

In one example, alternatively or in addition, the at least one memory stores program instructions that, when executed by the at least one processor, cause the apparatus to: provide an indication on the graphical user interface about multiple applications after recognizing multiple applications corresponding to the received user input; receive a selection of an application from the multiple applications via the graphical user interface; and wherein the downloading comprises downloading the selected application from the application store.

In one example, the at least one memory stores program instructions that, when executed by the at least one processor, cause the apparatus to: recognize a single application corresponding to the received user input; and wherein the downloading comprises downloading the application from the application store without further user input.

In one example, alternatively or in addition, receiving user input on the graphical interface comprises receiving textual user input identifying the name of an application to be downloaded at least partially.

In one example, alternatively or in addition, the at least one memory stores program instructions that, when executed by the at least one processor, cause the apparatus to: request approval from the user before downloading the application; and download the application after receiving the approval from the user.

In one example, alternatively or in addition, the user input comprises a location indication for a shortcut icon on the graphical user interface.

In one example, alternatively or in addition, the user input comprises at least a partial graphical icon identifying an application to be downloaded.

In one example, alternatively or in addition, the at least one memory stores program instructions that, when executed by the at least one processor, cause the apparatus to: provide an application management mode selector on the graphical user interface; and enter the application management mode after receiving user selection of the application management mode selector.

In an embodiment an apparatus comprises means for receiving user input on a touch sensitive graphical user interface providing a view of applications stored on an apparatus, the user input initiating downloading of an application to the apparatus; means for recognizing at least one application in an application store corresponding to the received user input; and means for downloading an application of the at least one application from the application store to a memory of the apparatus. In an example, the means may be implemented by at least one processor and at least one memory connected to the at least one processor.

In one example, the user input comprises a location indication for a shortcut icon on the graphical user interface, and the apparatus comprises means for receiving vocal information from the user; and means for recognizing at least one application corresponding to the received vocal information from the user.

In one example, alternatively or in addition, the apparatus comprises means for providing vocal information to the user about multiple applications after recognizing multiple applications corresponding to the received user input; means for receiving from the user vocal information selecting an application from the multiple applications; and wherein the downloading comprises downloading the selected application from the application store.

In one example, alternatively or in addition, the apparatus comprises means for providing an indication on the graphical user interface about multiple applications after recognizing multiple applications corresponding to the received user input; means for receiving a selection of an application from the multiple applications via the graphical user interface; and wherein the downloading comprises downloading the selected application from the application store.

In one example, alternatively or in addition, the apparatus comprises means for recognizing a single application corresponding to the received user input; wherein the downloading comprises downloading the application from the application store without further user input.

In one example, alternatively or in addition, receiving user input on the graphical interface comprises receiving textual user input identifying the name of an application to be downloaded at least partially.

In one example, alternatively or in addition, the apparatus comprises means for requesting approval from the user before downloading the application; and means for downloading the application after receiving the approval from the user.

In one example, alternatively or in addition, the user input comprises one of the following: a location indication for a shortcut icon on the graphical user interface; and at least a partial graphical icon identifying an application to be downloaded.

In an embodiment a computer readable medium having stored thereon a sequence of instructions which when executed by at least one processor, causes the at least one processor to perform a method comprising: receiving user input on a touch sensitive graphical user interface providing a view of applications stored on an apparatus, the user input initiating downloading of an application to the apparatus; recognizing at least one application in an application store corresponding to the received user input; and downloading an application of the at least one application from the application store to a memory of the apparatus.

In an embodiment a computer program comprising a sequence of instructions which when executed by at least one processor, causes the at least one processor to perform a method comprising: receiving user input on a touch sensitive graphical user interface providing a view of applications stored on an apparatus, the user input initiating downloading of an application to the apparatus; recognizing at least one application in an application store corresponding to the received user input; and downloading an application of the at least one application from the application store to a memory of the apparatus.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs).

The functions described herein performed by a controller may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages.

Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. In particular, the individual features, elements, or parts described in the context of one example, may be connected in any combination to any other example also.

The invention claimed is:

1. A method comprising:
receiving, outside a context of an application store, user input on a touch sensitive graphical user interface providing a view of applications stored on an apparatus, the user input comprising a user writing a name of a first application written within a predefined shape on the touch sensitive graphical user interface;
in response to the user writing the name of the first application within the predefined shape:
identifying a second application in the application store corresponding to the first application; and
downloading the second application from the application store to a memory of the apparatus.

2. The method according to claim 1, wherein the user input comprises a location indication for a shortcut icon on the graphical user interface.

3. The method according to claim 2, wherein the predefined shape is a polygon.

4. The method according to claim 2, wherein the user input further includes the predefined shape created by the user on the graphical user interface.

5. The method according to claim 1, comprising:
providing an indication on the graphical user interface about additional applications after recognizing the second application.

6. The method according to claim 1, wherein the downloading comprises downloading the second application from the application store without further user input.

7. The method according to claim 1, comprising:
requesting approval from the user before downloading the second application; and
downloading the second application after receiving the approval from the user.

8. The method according to claim 1, wherein receiving user input on the graphical interface comprises receiving voice command user input identifying the name of an application to be downloaded.

9. The method according to claim 8, wherein the user input further comprises one of the following:
a location indication for a shortcut icon on the graphical user interface; and
a graphical icon identifying an application to be downloaded.

10. The method according to claim 1, comprising:
providing an application management mode selector on the graphical user interface; and
entering the application management mode after receiving user selection of the application management mode selector.

11. An apparatus comprising:
at least one processor, and
at least one memory storing program instructions that, when executed by the at least one processor, cause the apparatus to:
receive, outside a context of an application store, user input on a touch sensitive graphical user interface providing a view of applications stored on an apparatus, the user input comprising a user writing a name of a first application written within a predefined shape on the touch sensitive graphical user interface;
in response to the user writing the name of the first application within the predefined shape:
identify a second application in the application store corresponding to the first application; and
download the second application from the application store to a memory of the apparatus.

12. The apparatus according to claim 11, wherein the user input comprises a location indication for a shortcut icon on the graphical user interface.

13. The apparatus according to claim 12, wherein the predefined shape is a polygon.

14. The apparatus according to claim 12, wherein the user input further includes the predefined shape created by the user on the graphical user interface.

15. The apparatus according to claim 11, the at least one memory storing program instructions that, when executed by the at least one processor, cause the apparatus to:
   provide an indication on the graphical user interface about additional applications corresponding to the received user input.

16. The apparatus according to claim 11, wherein the downloading comprises downloading the second application from the application store without further user input.

17. The apparatus according to claim 11, wherein receiving user input on the graphical interface comprises receiving voice command user input identifying the name of an application to be downloaded.

18. The apparatus according to claim 11, the at least one memory storing program instructions that, when executed by the at least one processor, cause the apparatus to:
   request approval from the user before downloading the second application; and
   download the second application after receiving the approval from the user.

19. The apparatus according to claim 18, wherein the user input comprises one of the following:
   a location indication for a shortcut icon on the graphical user interface; and
   a graphical icon identifying an application to be downloaded.

20. A computer readable memory having stored thereon a sequence of instructions which when executed by at least one processor, causes the at least one processor to perform a method comprising:
   receiving, outside a context of an application store, user input on a touch sensitive graphical user interface providing a view of applications stored on an apparatus, the user input comprising a name of a first application written within a predefined shape on the touch sensitive graphical user interface;
   in response to the user writing the name of the first application within the predefined shape
   identifying a second application in the application store corresponding to the first application; and
   downloading the second application from the application store to a memory of the apparatus.

* * * * *